(12) United States Patent
Nie

(10) Patent No.: US 6,433,834 B1
(45) Date of Patent: Aug. 13, 2002

(54) METHOD FOR SUPPRESSING NOISE IN SIGNALS

(75) Inventor: Xiaoning Nie, Vaterstetten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/416,027

(22) Filed: Oct. 8, 1999

(30) Foreign Application Priority Data

Oct. 8, 1998 (DE) .......................................... 198 46 453

(51) Int. Cl.$^7$ ................................................ H04N 5/21
(52) U.S. Cl. ........................................ 348/607; 348/619
(58) Field of Search ............................... 348/192, 193, 348/607, 619, 624, 621; 382/260, 262, 275; H04N 17/00, 5/21

(56) References Cited

U.S. PATENT DOCUMENTS 5,490,094 A    2/1996   Heimburger et al.

6,219,095 B1 *  4/2001   Zhang ........................ 348/192

FOREIGN PATENT DOCUMENTS

DE    1 271 161       1/1969
DE    31 14 275 C2    7/1989

* cited by examiner

*Primary Examiner*—Sherrie Hsia
(74) *Attorney, Agent, or Firm*—Laurence A. Greenberg; Werner H. Stemer; Gregory L. Mayback

(57) ABSTRACT

The method suppresses noise in a one-dimensional or multi-dimensional signal. A plurality of estimates for the noise-free useful signal are carried out on the basis of a measurement of the noisy signal, and each estimated value for each point is individually assigned a preference. A new estimated value for the useful signal is formed from the individual estimated values by arithmetic averaging weighted by the preference.

13 Claims, 3 Drawing Sheets

METHOD FOR SUPPRESSING NOISE IN SIGNALS

BACKGROUND OF THE INVENTION

Field of the Invention

The invention lies in the electronics field. More specifically, the invention pertains to a method of suppressing signal noise.

In many cases, undesirable noise is superimposed on a signal, either during the recording (acquisition) of the signal or in the course of transmission. The signals may be one-dimensional, for example voice signals; or two-dimensional, for example stationary images; or three-dimensional, for example picture sequences. In general, the problem of noise suppression may be described as follows:

A noise signal is additively superimposed on a useful signal (i.e., the wanted signal) $S_0(x,y,t)$:

$$S(x,y,t)=S_0(x,y,t)+R(x,y,t)$$

The question is: how to obtain a good estimate for $S_0(x,y,t)$ when $S(x,y,t)$ is measured (that is known) and, possibly, when the statistical characteristics of $R(x,y,t)$ are known.

Many noise suppression algorithms presuppose a constant signal and, as a rule, simply average the observed signal. In that case, it is generally assumed that the useful signal has a narrower bandwidth than the noise. The signal-to-noise ratio can be improved by a low-pass filter, such as an averaging filter. However, the assumption of a narrower bandwidth actually results in a problem with such a procedure since the details in a picture or the high frequencies in music are likewise located in the high frequency area. As a rule, they suffer from simple averaging. The requirement is thus for filters with the characteristic of retaining detail.

The most common methods in the prior art are so-called signal-adaptive methods. There, the aim is to detect the signal dynamics in the observed signal in order to average more strongly when major signal changes are present than for minor changes. As a rule, the weightings are in this case applied directly to the measured signal. For example, the normal practice in image processing is to look for specific values which have little signal dynamics. An averaging filter is then applied to these signal dynamics.

By way of example: Averaging of three pixels, which may be described as a homogeneous field.

The disadvantage in that case is that the other points are ignored, even though they likewise contain more or less information which could contribute to improving the estimated values.

SUMMARY OF THE INVENTION

It is accordingly an object of the invention to provide a method of suppressing signal noise, which overcomes the above-mentioned disadvantages of the heretofore-known methods of this general type and which suppressing noise in one-dimensional or multidimensional signals, in which the high frequency areas are not so heavily attenuated, so that corresponding details are retained.

With the foregoing and other objects in view there is provided, in accordance with the invention, a method of suppressing noise in a signal, which comprises: measuring a noisy signal $S(x,y,t)$ and carrying out a plurality of estimates for a corresponding noise-free useful signal $S_0(x,y,t)$ on a basis of the measurement of the noisy signal $S(x,y,t)$; individually assigning each estimated value $S_0^{(1)}$, $S_0^{(1)}$, $S_0^{(2)}$, ..., $S_0^{(k)}$ obtained for each point $(x,y,t)$ in carrying out the plurality of estimates a preference $\alpha_j(x,y,t)$, where $j=1,2,\ldots,k$; and $k$ is an integer; and forming a new estimated value $\overline{S}_0(x,y,t)$ for the useful signal from the estimated values $S_0^{(1)}, S_0^{(2)}, \ldots, S_0^{(k)}$ by arithmetic averaging weighted by the preference $\alpha_j(x,y,t)$.

In other words, the object of the invention is satisfied in that a plurality of estimates for the noise-free useful signal are carried out on the basis of a measurement of the noisy signal, and each of the estimated values obtained for each point is individually assigned a preference, and a new estimated value for the useful signal is then formed from the estimated values by arithmetic averaging weighted by the preference.

In accordance with an added feature of the invention, the estimated value $\overline{S}_0(x,y,t)$ is calculated with the following formula:

$$\overline{S}_o(x, y, t) = \sum_{j=1}^{k} \frac{\alpha_j(x, y, t)}{A} S_o^{(j)}(x, y, t), \text{ where}$$

$$A = \sum_{j=1}^{k} \alpha_j(x, y, t).$$

In accordance with an additional feature of the invention, the preference $\alpha_j(x,y,t)$ is determined by considering statistical characteristics of the noise.

In accordance with a further feature of the invention, the signal is a one-dimensional signal $S(t)$ and the method comprises determining one of the estimated values with an earlier-measured value, determining a further estimated value with a later-measured value, and determining the weighting factors or preference values $\alpha_j$ associated with the estimated values as a function of the signal.

In accordance with a preferred embodiment, the following estimated values and preferences are defined for the one-dimension signal:

$$S^{(1)}(t_0) = \frac{1}{2}[S(t_0) + S(t_0 + 1)],$$

$$\alpha_1(t_0) = \frac{1}{[S(t_0) - S^{(1)}(t_0)]^2};$$

$$S^{(2)}t_0 = \frac{1}{2}[S(t_0) + S(t_0 - 1)];$$

$$\alpha_2(t_0) = \frac{1}{[S(t_0) - S^{(2)}(t_0)]^2};$$

$$S^{(3)}t_0 = S(t_0);$$

$$\alpha_3(t_0) = \frac{1}{\sigma_n^2} \text{ and}$$

$$\overline{S}(t_0) = \frac{\sum_{i=1}^{3} \alpha_i \cdot S^{(i)}(t_0)}{\sum_{i=1}^{3} \alpha_j}$$

where $\sigma_n^2$ is selected from the group of consisting of a statistical variance of the noise and a value to be set by the user.

In accordance with another feature of the invention, the signal is a two-dimensional signal $S(x,y)$ and the method comprises determining further estimated values using adjacent measured signal values and are weighted by signal-dependent weighting factors or preference values $\alpha_j$.

In accordance with a preferred embodiment of the invention, mean values $S^{(1)}(x_0,y_0); \ldots; S^{(8)}(x_0,y_0)$ are formed from the measured signal value $S(x_0,y_0)$ of the two-dimensional signal, and respective adjacent measured signal values $S(x_0-1,y_0); S(x_0+1,y_0); S(x_0-1,y_0+1); S(x_0+1,y_0+1); S(x_0+1,y_0-1); S(x_0-1,y_0-1); S(x_0,y_0+1); S(x_0,y_0-1)$ are weighted by a factor $\alpha_j$, where $$\alpha_j = \frac{1}{[S(x_0, y_0) - S^{(j)}(x_0, y_0)]^2};$$

and the estimated value is determined from the mean value of the estimated values $S^{(1)}(x_0,y_0); \ldots; S^{(8)}(x_0,y_0)$ weighted in such a way and the measured value $S(x_0,y_0)$ weighted by a factor $\alpha_9$ which is predetermined by the user or is calculated using the formula $$\alpha_9 = \frac{1}{\sigma_n^2},$$

where $\sigma_n^2$ represents a statistical variance of the noise.

In other words, for two-dimensional signals it is particularly preferable for the mean values to be formed from the measured signal value and the eight respective adjacent measured signal values, and to be weighted in each case by a factor which is defined as the reciprocal of the square of the difference between the measured signal value and the respective mean value and for the new estimated value for the noise-free signal then to be determined from the mean value of the estimated values weighted by this factor and the measured value weighted by a factor which is predetermined by the user or is calculated using the statistical variance of the noise.

In accordance with again an added feature of the invention, the signal is a three-dimensional signal $S(x_0,y_0,t_0)$, such as a television picture signal, and the method comprises using an estimated result of a previous sampling time $\overline{S}(x_0,y_0,t_0-1)$ as the first estimated value $S^{(1)}(x_0,y_0,t_0)$, using the mean value of a present pixel and of the points located in front of and behind the present pixel on the same line (median) $\{S(x_0-1,y_0,t^0), S(x_0,y_0,t_0), S(x_0+1,y_0,t_0)\}$ as the second estimated value $S^{(2)}(x_0,y_0,t_0)$, and using the value of the current pixel $S(x_0,y_0,t_0)$ as the third estimated value $S^{(3)}(x_0,y_0,t_0)$, and determining the final estimated value by averaging the first, second and third estimated values $\overline{S}(x_0,y_0,t_0)$, weighted by one of signal-dependent weighting factors and preference values $\alpha_j$.

In accordance with again a preferred embodiment of the invention, the estimated values are weighted as follows:

$$S^{(1)}(x_0, y_0, t_0) \text{ with } \frac{1}{[S^{(1)}(x_0, y_0, t_0) - S(x_0, y_0, t_0)]^2};$$

$$S^{(2)}(x_0, y_0, t_0) \text{ with } \frac{1}{[S^{(2)}(x_0, y_0, t_0) - S(x_0, y_0, t_0)]^2};$$

$$S^{(3)}(x_0, y_0, t_0) \text{ with } \frac{1}{\sigma_n^2}$$

where $\sigma_n^2$ represents a statistical variance of the noise or a value to be set by a user.

In other words, for three-dimensional signals, for example television pictures, it is particularly preferable for the estimated result of the previous sampling time to be used as the first estimated value, for the mean value of the current pixel and of those points which are located in front of and behind it on the same line to be used as the second estimated value, and for the value of the current pixel to be used as the third estimated value, while the three estimated values are weighted for the determination of the final estimated value of the noise-free signal by averaging from the three estimated values with the given factors:

The estimated result of the previous sampling time with the reciprocal of the square of the difference of the previous estimated value and of the current measured value, the mean value of the current pixel and of those points which are located in front of and behind it on the same line with the reciprocal of the square of the difference of this mean value and of the current measured value, and the actual measured value with the reciprocal of the statistical variance of the noise or a value which can be set by the user.

In accordance with a concomitant feature of the invention, an upper and a lower limit are defined for the preference values $\alpha_j$ and weighting factors.

$$\frac{1}{\sigma_n^2}.$$

Other features which are considered as characteristic for the invention are set forth in the appended claims.

Although the invention is illustrated and described herein as embodied in a method for suppressing noise in signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

According to the invention, a general two-stage method is proposed: a plurality of estimates $S_0^{(1)}, S_0^{(2)}, \ldots, S_0^{(k)}$ can be carried out with the measurement of $S(x,y,t)$ and, possibly, with the knowledge of the statistical characteristic of the noise. If each of these estimated values is individually assigned a preference $\alpha_j(x,y,t)=1,2,\ldots,k$ for each point $(x,y,t)$, then the new estimated value is given by:

$$\overline{S}_0(x, y, t) = \sum_{j=1}^{k} \frac{\alpha_j(x, y, t)}{A} S_0^{(j)}(x, y, t), \text{ where } A = \sum_{j=1}^{k} \alpha_j(x, y, t).$$

Figure 1:
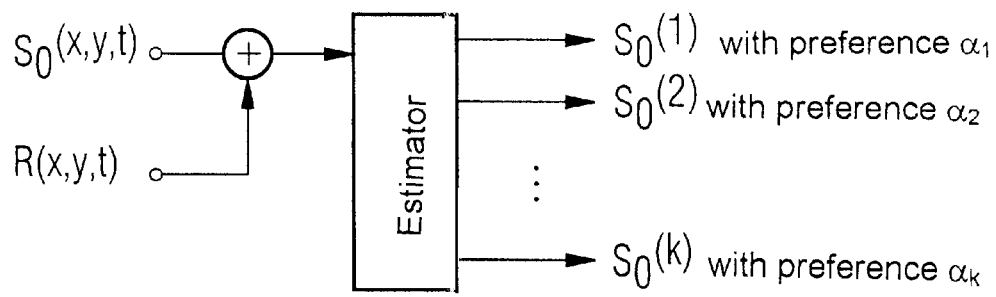
FIG. 1 is a schematic illustration of the fundamental principle of the invention for three-dimensional signals.
Figure 2:
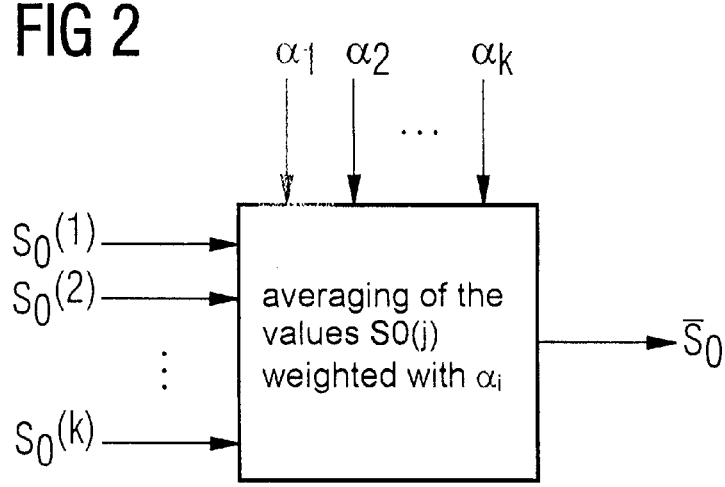
FIG. 2 is a schematic illustrating the averaging of the signals according to the invention.

The method according to the invention for forming the estimated values $S_0^{(j)}$ and the associated preference values is illustrated schematically in FIG. 1. The corresponding averaging is illustrated schematically in FIG. 2.

Referring now to the figures of the drawing in more detail, the following text will now describe the method according to the invention in more detail using an exemplary embodiment which relates to a one-dimensional signal $S(t)$.

Figure 3:
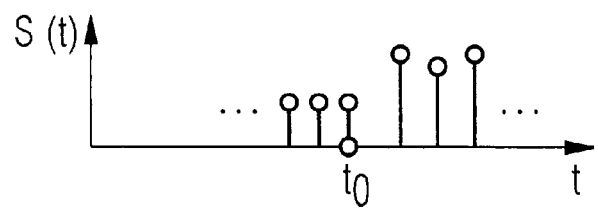
FIG. 3 is a time graph of an example of a one-dimensional noisy signal.
Figure 4:
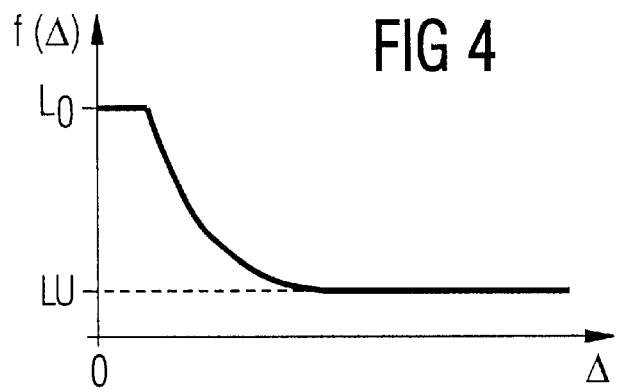
FIG. 4 is a graph of an exemplary function for determining the weighting factors according to the invention.

The corresponding signal $S(t)$ is illustrated in FIG. 3.

The signal $S(t)$ has been observed. The object is now to find the estimated value $\overline{S}(t_0)$. The estimated values $S^{(j)}(t_0)$ are determined by forming the arithmetic mean from the values $S(t_0)$; $S(t_0+1)$; $S(t_0-1)$ which are adjacent in time:

$$S^{(1)}(t_0) = \frac{1}{2}[S(t_0) + S(t_0 + 1)]$$

and the weighting factor $\alpha_1(t_0) = f(|S(t_0) - S^{(1)}(t_0)|)$ as well as $$S^{(2)}(t_0) = \frac{1}{2}[S(t_0) + S(t_0 - 1)];$$

$$\alpha_2(t_0) = f(|S(t_0) - S^{(2)}(t_0)|);$$

and $S^{(3)}(t_0) = S(t_0)$

A function $f(\Delta)$, which has a given profile, is used in this case to calculate the preference values or weighting factors $\Delta_j$. The function $$f(\Delta) = \frac{1}{\Delta^2}$$

has been found to be particularly preferable in this case, for example, and it is furthermore particularly preferable to provide an upper limit value LO and a lower limit value LU for the function $f(\Delta)$.

The weighting factor for the currently measured value $S(t_0)$ must now also be determined.

If $\sigma_n^2$ is known as the variance of the noise, then it can be said that $\alpha_3 1/\sigma_n^2$. Otherwise, $\alpha_3$ may be assumed to be a variable which can be set by the user.

The following formula is thus used to determine the improved estimated value $\overline{S}(t_0)$ according to the invention:

$$\overline{S}(t_0) = \left(\sum_{1}^{3} \alpha_i S^{(i)}(t_0)\right) / \sum_{1}^{3} \alpha_i.$$

Figure 5:
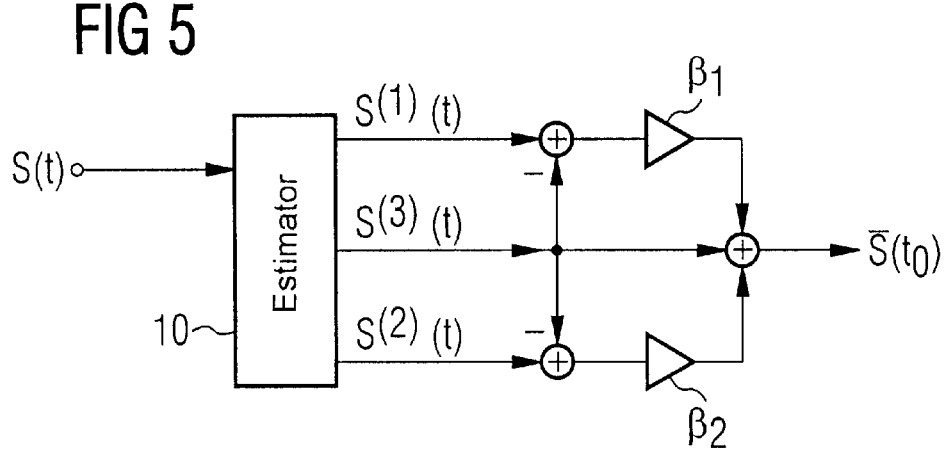
FIG. 5 is a schematic illustration of the method according to the invention for a one-dimensional signal S(t)

FIG. 5 shows a non-recursive arrangement for a circuitry implementation of the method according to the invention. In this circuit, the noisy signal $S(t)$ is fed to an estimator 10.

This circuit 10 has two memories for the previous values $S(t-1)$ and $S(t-2)$. In this way, the circuit 10 can thus provide the estimated values $S^{(1)}(t)$, $S^{(2)}(t)$ and $S^{(3)}(t)$, calculated using the formula according to the invention, delayed by one step. These three estimated values are thus present at the output of the circuit 10.

The following conversions are carried out in order to avoid the need for a variable gain amplifier to weight these values:

$$\beta_1 = \frac{\alpha_1}{(\alpha_1 + \alpha_2 + \alpha_3)} \text{ and } \beta_2 = \frac{\alpha_2}{(\alpha_1 + \alpha_2 + \alpha_3)}.$$

It follows that $\beta_3 = 1 - \beta_1 - \beta_2$, owing to the normalization of the weighting factors.

The signals which are present at the output of the circuit 10 can then be processed further as follows using only two controllable amplifiers: the signal $S^{(3)}(t)$ is passed with a negative mathematical sign to two summation points in each case, at which the signals $S^{(1)}(t)$ and $S^{(2)}(t)$ with positive mathematical signs are added. The output of these summation points then leads to the input of the controllable amplifiers, whose gain factors are $\beta_1 + \beta_2$. Their outputs are added to one another and to the signal $S^{(3)}(t)$ at a further summation point. The improved estimated value $\overline{S}(t_0)$ is thus present at the output of this summation point.

Figure 6:
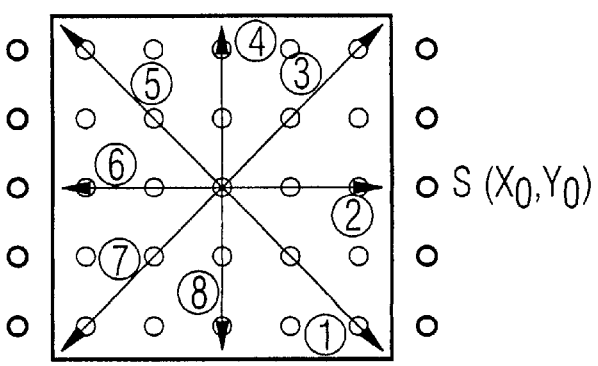
FIG. 6 is a diagrammatic view of an exemplary two-dimensional noisy signal.

The following text describes a further exemplary embodiment of the invention for processing a two-dimensional signal, as is illustrated in FIG. 6. This may be, for example, a stationary image, i.e., a single picture image. The procedure in this case is as follows:

The points which are adjacent to $(x_0, y_0)$ are split into eight subsets. The mean value can be formed in each direction, giving $S^{(1)}(x_0, y_0), \ldots, S^{(8)}(x_0, y_0)$. The preference values are then:

$$\alpha_i = f(|S(x_0, y_0) - S^{(i)}(x_0, y_0)|), i=1,2,\ldots 8, \alpha_0 = 1/\sigma_n^2$$

and $$f(\Delta) = \frac{1}{\Delta^2}.$$

In this case, the improved estimated value thus becomes:

$$\overline{S}(x_0, y_0) = \left[\sum_{1}^{9} \alpha_i S^{(i)}(x_0, y_0)\right] / \sum_{1}^{9} \alpha_i.$$

In this case, it is particularly preferable for an upper and a lower limit to be defined for the function $$f(\Delta) = \frac{1}{\Delta^2}.$$

Figure 7:
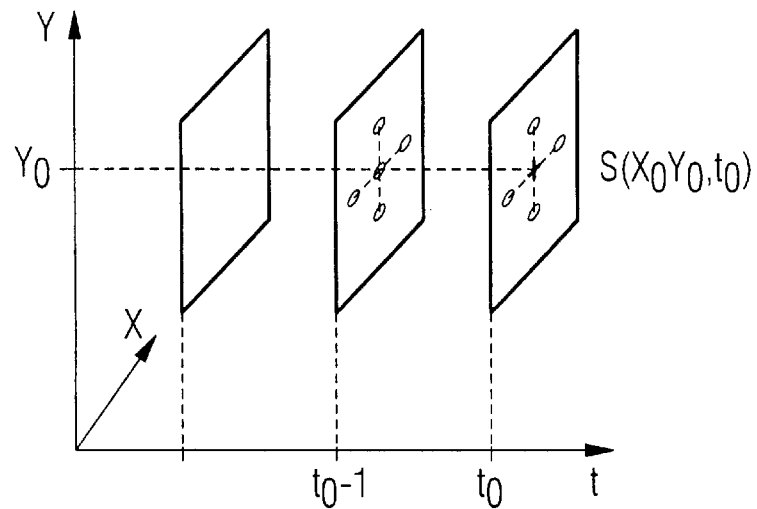
FIG. 7 is a graph of an exemplary three-dimensional signal.

Furthermore, the following text describes a method according to the invention for processing a three-dimensional signal, that is to say, for example, a television picture. Such a signal is illustrated in FIG. 7. The present solution according to the invention in this case takes account of the fact that a very large number of data items must be processed very quickly in television pictures so that, on the one hand, the memory requirements must not be excessive and, on the other hand, no excessively complex computation operations should be carried out.

According to the invention, the following expressions should be used as the estimated values:

$$S^{(1)}(x_0, y_0, t_0) = \overline{S}(x_0, y_0, t_0 - 1)$$

$$S^{(2)}(x_0, y_0, t_0) = \text{Median}\{S(x_0 - 1, y_0, t_0), S(x_0, y_0, t_0), S(x_0 + 1, y_0, t_0)\}$$

$$S^{(3)}(x_0, y_0, t_0) = S(x_0, y_0, t_0)$$

The associated preference values are $$\alpha_1 = f(S^{(1)}(x_0,y_0,t_0) - S(x_0,y_0,t_0))$$

$$\alpha_2 = f(S^{(2)}(x_0,y_0,t_0) - S(x_0,y_0,t_0))$$

$$\alpha_3 = 1/\sigma_n^2$$

This results in the estimated value $$\overline{S}(x_0, y_0, t_0) = \left(\sum_1^3 \alpha_i S^{(i)}(x_0, y_0, t_0)\right) \bigg/ \sum_1^3 \alpha_i.$$

Now let $$\beta_1 = \alpha_i \bigg/ \sum_1^3 \alpha_i$$

from which it follows that $$\overline{S}(x_0, y_0, t_0) = \left(\sum_{i=1}^3 \beta_i S^{(i)}(x_0, y_0, t_0)\right).$$

where $\beta_1 + \beta_2 + \beta_3 = 1$.

$$\overline{S}(x_0,y_0,t_0) = \beta_1[S^{(1)}(x_0,y_0,t_0) - S(x_0,y_0,t_0)] + \beta_2[S^{(2)}(x_0,y_0,t_0) - S(x_0,y_0,t_0)] + S(x_0,y_0,t_0)$$

Figure 8:
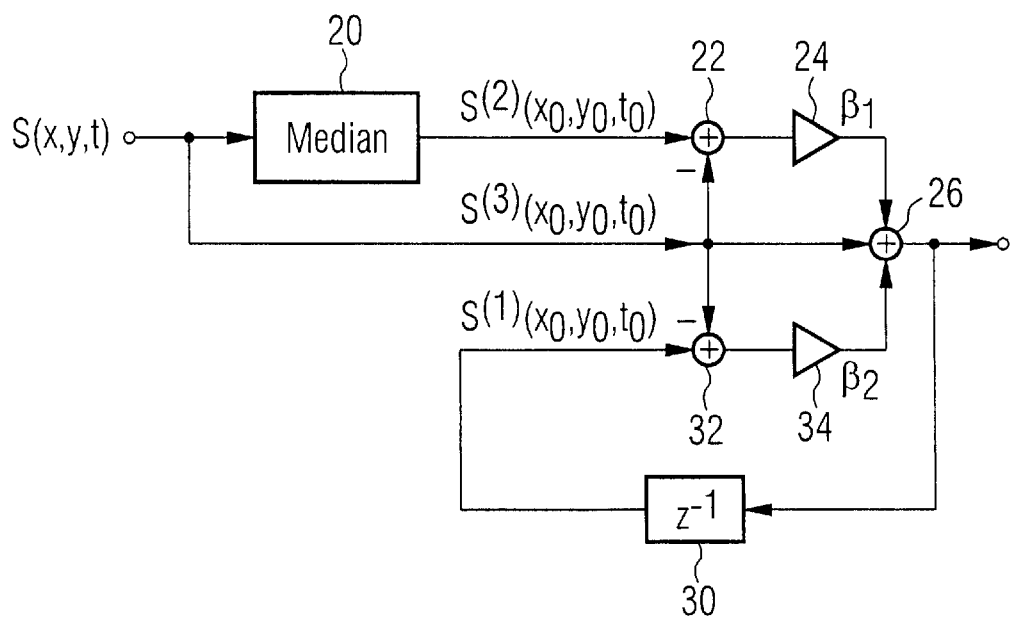
FIG. 8 is a schematic for processing, according to the invention, a noisy three-dimensional signal.

The method according to the invention can thus be configured with the recursive circuit configuration shown in FIG. 8. As is shown in FIG. 8, the signal $S(x,y,t)$ (which, by definition, also corresponds to the third estimated value $S^{(3)}(x_0,y_0,t_0)$) is fed to an averaging circuit 20. This circuit forms the mean value of the signals over the pixels $S(x_0-1,y_0,t_0)$, $S(x_0,y_0,t_0)$, $S(x_0+1,y_0,t_0)$ which are adjacent in the line. The output of the averaging circuit 20 thus produces the second estimated value. This is fed to a summation point 22, to which the input signal is also fed, with a negative mathematical sign. The output of this summation point 22 is fed to a controllable amplifier 24 with a gain factor $\beta_1$. Its output is connected to a summation point 26 on the output side.

The output of the summation point 26 on the output side provides the improved estimated value, according to the invention, for $\overline{S}(x_0,y_0,t_0)$. This output signal is at the same time fed to a memory 30, in which the signal is delayed by one clock cycle. The output of the memory 30 thus provides the first estimated value, namely the value of the same pixel from the previous sampling time, that is to say the previous image. This signal is fed to a further summation point 32, to whose other input the negative input signal $S(x,y,t)$ is applied. The output of this further summation point 32 is connected to a further controllable amplifier 34, whose gain factor is $\beta_2$. The output of this amplifier 34 is likewise additively fed to the summation point 26 on the output side.

I claim:

1. A method of suppressing noise in a signal, which comprises:
   measuring a noisy signal $S(x,y,t)$ and carrying out a plurality of estimates for a corresponding noise-free useful signal $S_0(x,y,t)$ on a basis of the measurement of the noisy signal $S(x,y,t)$;
   individually assigning each estimated value $S_0^{(1)}$, $S_0^{(2)}, \ldots, S_0^{(k)}$ obtained for each point $(x,y,t)$ in carrying out the plurality of estimates a preference $\alpha_j(x,y,t)$, where $j=1,2,\ldots,k$, and k is an integer; and
   forming a new estimated value $\overline{S}_0(x,y,t)$ for the useful signal from the estimated values $S_0^{(1)}, S_0^{(2)}, \ldots, S_0^{(k)}$ by arithmetic averaging weighted by the preference $\alpha_j(x,y,t)$.

2. The method according to claim 1, which comprises calculating the estimated value $\overline{S}_0(x,y,t)$ with the following formula:

$$\overline{S}_o(x, y, t) = \sum_{j=1}^k \frac{\alpha_j(x, y, t)}{A} S_o^{(j)}(x, y, t), \text{ where } A = \sum_{j=1}^k \alpha_j(x, y, t).$$

3. The method according to claim 1, which comprises determining the preference $\alpha_j(x,y,t)$ with statistical characteristics of the noise.

4. The method according to claim 3, wherein the signal is a one-dimensional signal $S(t)$ and the method comprises determining one of the estimated values with an earlier-measured value, determining a further estimated value with a later-measured value, and determining weighting factors or preference values $\alpha_j$ associated with the estimated values as a function of the signal.

5. The method according to claim 4, which comprises defining the following estimated values and preferences:

$$S^{(1)}(t_0) = \frac{1}{2}[S(t_0) + S(t_0 + 1)],$$

$$\alpha_1(t_0) = \frac{1}{[S(t_0) - S^{(1)}(t_0)]^2};$$

$$S^{(2)}(t_0) = \frac{1}{2}[S(t_0) + S(t_0 - 1)];$$

$$\alpha_2(t_0) = \frac{1}{[S(t_0) - S^{(2)}(t_0)]^2};$$

$$S^{(3)}(t_0) = S(t_0);$$

$$\alpha_3(t_0) = \frac{1}{\sigma_n^2} \text{ and}$$

$$\overline{S}(t_0) = \frac{\sum_{i=1}^3 \alpha_i \cdot S^{(i)}(t_0)}{\sum_{i=1}^3 \alpha_j}$$

where $\sigma_n^2$ is selected from the group of consisting of a statistical variance of the noise and a value to be set by user.

6. The method according to claim 5, which comprises defining an upper and a lower limit for the preference values $\alpha_j$ and weighting factors $$\frac{1}{\sigma_n^2}.$$

7. The method according to claim 3, wherein the signal is a two-dimensional signal $S(x,y)$ and the method comprises determining further estimated values using adjacent measured signal values and are weighted by signal-dependent weighting factors or preference values $\alpha_j$.

8. The method according to claim 7, which comprises forming mean values $S^{(1)}(x_0,y_0); \ldots ; S^{(8)}(x_0,y_0)$ from the measured signal value $S(x_0,y_0)$ and weighting respective adjacent measured signal values $S(x_0-1,y_0); S(x_0+1,y_0); S(x_0-1,y_0+1); S(x_0+1,y_0+1); S(x_0-1,y_0-1); S(x_0,y_0+1); S(x_0,y_0-1)$ weighted by a factor $\alpha_j$, where $$\alpha_j = \frac{1}{[S(x_0, y_0) - S^{(j)}(x_0, y_0)]^2};$$

and determining the estimated value from the mean value of the estimated values $S^{(1)}(x_0,y_0); \ldots ; S^{(8)}(x_0,y_0)$ weighted in such a way and the measured value $S(x_0,y_0)$ weighted by a factor $\alpha_9$ which is predetermined by user or is calculated using the formula $$\alpha_9 = \frac{1}{\sigma_n^2},$$

where $\sigma_n^2$ represents a statistical variance of the noise.

9. The method according to claim 8, which comprises defining an upper and a lower limit for the preference values $\alpha_j$ and weighting factors $$\frac{1}{\sigma_n^2}.$$

10. The method according to claim 3, wherein the signal is a three-dimensional signal $S(x_0,y_0,t_0)$ and the method comprises using an estimated result of a previous sampling time $\overline{S}(x_0,y_0,t_0-1)$ as the first estimated value $S^{(1)}(x_0,y_0,t_0)$, using the mean value of a present pixel and of the points located in front of and behind the present pixel on the same line (median) $\{S(x_0-1,y_0,t_0), S(x_0,y_0,t_0), S(x_0+1,y_0,t_0)$ as the second estimated value $S^{(2)}(x_0,y_0,t_0)$, and using the value of the current pixel $S(x_0,y_0,t_0)$ as the third estimated value $S^{(3)}(x_0,y_0,t_0)$, and determining the final estimated value by averaging the first, second and third estimated values $\overline{S}(x_0,y_0,t_0)$, weighted by one of signal-dependent weighting factors and preference values $\alpha_j$.

11. The method according to claim 10, wherein the signal is a television picture signal.

12. The method according to claim 10, which comprises weighting the estimated values as follows:

$$S^{(1)}(x_0, y_0, t_0) \text{ with } \frac{1}{[S^{(1)}(x_0, y_0, t_0) - S(x_0, y_0, t_0)]^2};$$

$$S^{(2)}(x_0, y_0, t_0) \text{ with } \frac{1}{[S^{(2)}(x_0, y_0, t_0) - S(x_0, y_0, t_0)]^2};$$

$$S^{(3)}(x_0, y_0, t_0) \text{ with } \frac{1}{\sigma_n^2}$$

where $\sigma_n^2$ represents a value selected from the group consisting of a statistical variance of the noise and a value to be set by a user.

13. The method according to claim 12, which comprises defining an upper and a lower limit for the preference values $\alpha_j$ and weighting factors $$\frac{1}{\sigma_n^2}.$$

* * * * *